3,705,852
STABLE SOLUTIONS OF CALCIUM SALTS
Alfred Fischer, Bronx, N.Y., assignor to
Tenneco Chemicals, Inc.
No Drawing. Filed Dec. 1, 1970, Ser. No. 95,423
Int. Cl. C10m 1/24, 3/18, 5/16
U.S. Cl. 252—1   17 Claims

ABSTRACT OF THE DISCLOSURE

Stable solutions of calcium salts are provided containing a first calcium salt of a branched chain aliphatic monocarboxylic acid and a second calcium salt of a branched-chain aliphatic monocarboxylic acid or of a cycloaliphatic monocarboxylic acid.

---

Metal salts of organic acids have long been used in drying oil compositions and in surface-coating compositions containing these oils to hasten the drying process and to promote the polymerization of the unsaturated oils to dry, mechanically-resistant coatings. To be useful commercially as a drier, a metal salt should be stable indefinitely in storage, and it should be completely soluble in the hydrocarbon solvents ordinarily used in drier compositions as well as in drying oils, semi-drying oils, and vehicles prepared from these oils. It should form hydrocarbon solutions which have relatively low viscosities even at relatively high metal salt concentratioins so as to permit its ready dispersion in the vehicle, and it should not discolor nor precipitate from the vehicle on prolonged storage. The metal salt should be effective as a drier in an amount that is not detrimental to the gloss, flexibility, adhesion, and other properties of the coating composition. In addition, the metal salt should be uniform in composition and should be relatively low in cost.

Among the useful drier acid salts, used especially for non-toxic formulations, e.g. for those paints which should not contain any lead and which are, for example, for household use, are the calcium salts of branched-chain, saturated or olefinically unsaturated, aliphatic carboxylic acids. Solutions of these salts are effective as drying agents and are substantially completely non-toxic.

Generally, the calcium salts of branched-chain aliphatic carboxylic acids are soluble in a wide range of organic solvents miscible with synthetic resins or with the usual solvent vehicles used in paint. Generally, the corresponding salts of normal, or straight chain, aliphatic carboxylic acids are not soluble. Solutions of the branched-chain salts in common organic solvents, for example mineral spirits, are completely stable as long as the solution is bone dry and is stored sealed or in a completely dry atmosphere.

It has been found, however, that upon extended storage, especially under conditions of humidity or high moisture content, solutions of these salts tend to crystallize and precipitate from solution. This precipitation is believed to be caused by hydration of the salt molecule and the formation of a hydrate having approximately one mole of water for every two moles of calcium present, i.e.

$$2Ca(OOCR)_2 \cdot H_2O$$

Generally, the most useful drier salts, because of their economic availability and effectiveness, are the salts of the alpha-substituted branched-chain aliphatic carboxylic acids, especially the saturated aliphatic acids, such as the salt of 2-ethylhexanoic acid. Alpha-substituted acid salts include salts of acids which are also substituted at other positions. Unfortunately, these are also the calcium salts most seriously affected by moisture, tending to hydrate and precipitate from solution under moist or humid conditions. Generally, the salts of those branched-chain aliphatic acids which have two substituents in the alpha position or which are beta-substituted (i.e. the substituent closest to the carboxyl group is in the beta-position) or more distantly substituted i.e. gamma, -delta-, etc. substituted are not as adversely affected by moist and humid conditions and tend to be less prone to precipitate from solution. For example, a solution of calcium 2-ethylhexoate will precipitate and form a distinct crystalline mass after several months standing in even a closed container. However, a calcium salt of the beta-substituted Oxo $C_8$ acid will become cloudy under the same conditions. In either case, of course, the cloudiness or crystallization is undesirable from a commercial standpoint and renders the use of such salts impractical and not commercially feasible under conditions where they would have to be stored for substantial periods.

As solutions of these salts are especially formulated so as to simplify the dispersion of the salts throughout the product to which it is added, the formation of crystals will interfere with this purpose.

Solutions of these calcium salts in addition are useful as non-toxic stabilizer additives for synthetic resins, especially polyvinyl chloride resins; the same problem is met when these "liquid" stabilizers precipitate and form a two phase mixture of crystals and solutions prior to admixture with the resin.

Certain salts used by the art do not crystallize due to hydration under moist storage conditions. For example, calcium salts of the naphthenic acids or of tall oil do not tend to so crystallize. As a result, the commercial calcium salts sold heretofore in solution have been the naphthenates or tallates. Because of the high molecular weight of these salts, however, a high calcium content cannot be achieved without preparing an extremely viscous solution. Accordingly, small proportions of other salts, such as 2-ethyl hexoates, were added to increase the metal content. However, in all cases the other salts were added in small amounts.

It has now been found, quite surprisingly, that these unstable solutions of calcium salts can be stabilized by the addition of even a small amount of a calcium salt of a structurally different type of acid to form a mixed solution of calcium salts of the two acids. The mixed solution is equally as effective both as a drying agent and for resin stabilization as the solution of the salt of one of the acids, but is stable, even for long storage times, under humid or moist conditions. In accordance with the present invention, there is provided a stable solution containing dissolved calcium comprising a major molar proportion of a first calcium salt of at least one branched-chain, olefinically unsaturated or saturated, aliphatic monocarboxylic acid having from about six to about 18 carbon atoms, all of the acid of the first salt being of the same structural type, i.e. substituted in the same effective position with regard to the carboxyl group; the first salt being combined with a minor molar proportion of a second calcium salt of at least one acid selected from the group consisting of saturated and olefinically unsaturated cycloaliphatic monocarboxylic acids and olefinically unsaturated and saturated branched-chain aliphatic monocarboxylic acids. If the second acid is an aliphatic acid, it should be substituted in a different effective position than the acid formed from the first salt.

The present invention contemplates that each of the first and the second salts can be mixtures of salts of different acids or of mixed salts of two different acids. The first salt, however, should contain acids of only a single structural type, i.e. the closest substituent in the same effective position. The term "same effective position" in this invention refers to the position of the branched-chain with regard to the carboxyl group; the alpha position is considered one effective position and two substituents in the alpha position is considered a second effective position; the beta position and all other substituent positions are considered a third effective position. Salts of acids having only the beta or further removed substituents are considered equivalent because they have substantially the same stability under moist conditions, whereas the alpha-substituted and di-substituted acid salts have a lesser stability under such conditions. It has further been found again that calcium salts of the alpha mono-branched acids are generally more susceptible to hydration and precipitation than are the di-branched alpha acids.

Generally, it has been found that the preferred salts are of acids having the closest branch no further removed from the carboxyl group than the epsilon position. These are the most readily available acids, commercially.

The preferred acids for use in the present invention for forming the first calcium salt contain from about 6 up to about 12 carbon atoms. The saturated aliphatic acids tend to be more readily available and therefore are most preferred; however, salts of the unsaturated acids when available can be readily used. Useful salts include the calcium salts of alpha-substituted acids such as the saturated 2-ethylbutanoic acid, 2-methylpentanoic acid, 2-ethyl-4-methylpentanoic acid, 2-propylheptanoic acid and the unsaturated 2-ethylhexenoic acid; the calcium salts of alpha-disubstituted acids include the mixed trialkyl acetic acids containing from 9 to 11 carbon atoms in each molecule, commercially sold as Versatic 911, a mixture of trialkyl acetic acids containing 10 carbon atoms in each molecule known as Neodecanoic acid; and 2,2-dimethylpentanoic acid; the calcium salts of the beta or higher substituted acids include the calcium salts of 3,5,5-trimethylhexanoic acid, 3-ethyloctanoic acid, 3-methylhexanoic acid, 4,5-dimethylhexanoic acid, 4-ethylnonanoic acid and the $C_8$, $C_{10}$ and $C_{13}$ Oxo acids.

The Oxo acids are prepared by the oxidation of the corresponding aldehydes in accordance with the process described in U.S. Pat. No. 3,124,475 to Fischer et al. The Oxo acids generally contain mixtures of the 3,4-; 3,5- and 4,5-substituted acids and some proportion of a 5-methyl substituted acid. The $C_8$-$C_{18}$ Oxo acids, according to Fischer et al., may be prepared from aldehydes prepared from the reaction of $C_{7-17}$ olefins with carbon monoxide and hydrogen in the presence of a carbonylation catalyst. The olefins from which the aldehydes are prepared include those that occur in nature or they may be polymers of lower molecular weight olefins such as propylene, butylene or isobutylene. The procedures by which these olefins are converted to aldehydes are well known in the art.

The first calcium salt, in accordance with this invention, as explained above, can be a salt of a single acid or can be a mixed salt or a mixture of salts of two or more different acids, i.e. a single salt molecule containing two different acid groups or a mixture of salts of two or more of the above acids, or both. For example, salts of the oxo acids or of Versatic 911 will be salts of a mixture of acids.

The second salt, in accordance with the present invention, can be selected from among the branched-chain acid salts defined above but containing an acid moiety substituted at a different effective position than in the first salt, e.g. the first calcium salt can be a salt of an alpha-substituted acid and the second salt can be a salt of a beta-substituted acid. Alternatively, the second calcium salt can be derived from saturated or unsaturated cycloaliphatic acids, such as the salts of naphthenic acids, p-menthane carboxylic acids (terpene acids) and rosin acids.

The calcium salts in accordance with this invention, can be dissolved in any inert organic, preferably nonpolar solvent including hydrocarbons such as mineral spirits, Stoddard's solvent, benzene, toluene, xylene, naphtha, kerosene, dipentene, turpentine and other commonly available, economical solvents having low toxicity and odor. Other inert solvents include the chlorinated hydrocarbons and the higher alcohols such as dichloroethylene and isooctanol, as well as the monohydroxyethers such as the monoalkyl ethers of ethylene glycol, diethylene glycol, triethylene glycol, propylene glycol, dipropylene glycol and tripropylene glycol.

When the second calcium salt is the salt of a cycloaliphatic carboxylic acid, the second salt is preferably present in not more than about 30 mole percent of the total calcium present. When both the first and second salts are salts of branched-chain aliphatic carboxylic acids, the two acids can be present in any proportions and even in substantially equal molar proportions. Accordingly, the definition of major and minor would also encompass such apparently equal molar mixtures of salts of two aliphatic branched-chain acids which are substituted in two different effective positions.

Preferably, the second salt is present in an amount of at least about one mole percent of the combined total salt content, but preferably in an amount of at least about 2½ mole percent. The unobviousness of the present invention is most surprisingly shown by two salts, both of which are unstable when present alone in solution, but which is combination result in a stable solution. More than 30 mol percent of the second salt is not needed to stabilize.

The calcium salts used in the present invention can be prepared by any known method. For example, calcium salts can be prepared individually from the acids directly by reaction in a suitable solvent with the required proportion of calcium metal, calcium hydroxide, or calcium oxide, or other calcium salt, such as calcium acetate. The salts can also be prepared by a double decomposition type reaction by mixing in solution, for example, a calcium salt and a sodium salt of the desired acid, e.g. $CaCl_2$ with sodium 2-ethylhexanoate. The calcium salt can be prepared from a single acid to form a single salt or from a mixture of acids to form in situ a mixed salt or a mixture of salts.

The individual prepared calcium salts can be dissolved and the solution then mixed to prepare the final solution, or the salts can be added as solids to the solvent and then heated for dissolution. The two salts can also be prepared mixed in situ by any of the above methods. Alternatively, there can be added to a solution of a calcium salt of an acid of a first structural type the desired amount of a free acid of a second structural type followed by heating. This will result in a solution containing a mixture of the calcium salts of the two different acids or the mixed salt of the two acids, with some free acid. All procedures for preparing the final stable solutions are substantially equivalent and it has been found that any procedure to obtain the finally described solution results in an effectively stabilized solution of calcium salts.

Generally, the liquid solutions of calcium soaps contain up to about 9% by weight and preferably 4 to 8 percent by weight of calcium, as the metal; the actual metal content is limited for a particular salt solution depending upon the molecular weight of the acid group and the viscosity desired for the final solution. Many additives can be added to decrease the viscosity of the solution when desired, such as the alkyl acid phosphates described in U.S. Pat. No. 2,456,824, and the polyoxyalkylene glycols, such as dipropylene glycol and tripropylene glycol as described in U.S. Pat. 2,807,553. Furthermore, the monohydroxyether forms solution having lower viscosities than corresponding solutions in hydrocarbon solvents.

The following examples show the advantages and the unobvious qualities of the present invention but are not intended to be exclusive of the scope of the present invention.

COMPARATIVE EXAMPLE A

A solution of calcium 2-ethylhexanoate was prepared by adding 362 grams (2.5 mols) of 2-ethylhexanoic acid to an agitated slurry of 92.5 grams (1.25 mols) of calcium hydroxide in 450 grams of mineral spirits and 100 grams of tripropylene glycol. After all the acid has been added, the mixture was heated to and maintained at 250° F. for 30 minutes to eliminate the water formed. The reaction mixture was then filtered. Additional mineral spirits solvent was added to give 992 grams of a pale, straw-colored product containing 5% by weight of calcium as metal. One portion of the product is placed in a one ounce open jar and stored exposed to the atmosphere. After five days, crystals were observed suspended throughout the body of the product and crystallization became very extensive with continued open storage.

A second portion of the product was stored in a closed bottle. After about two months storage some crystallization was observed which progressively increased with continued storage. Upon reheating to 250° F. the crystallized product redissolved. A portion of the heated redissolved solution developed crystals after additional two months storage in a closed bottle. A second portion of the redissolved solution developed crystallization after storage in an open bottle for six to seven days. To a third portion comprising 100 grams of the above clear solution 1.0 gram of a 50% solution of water in 2-ethoxyethanol was added. The 2-ethoxyethanol acts as a mutual solvent for the water and the calcium 2-ethylhexanoate. The solution containing 0.5% added water was stored in a closed bottle. After about one month storage, crystals were observed and after a second month storage, a considerable amount of crystals had formed.

COMPARATIVE EXAMPLE B

Example A was repeated except that the 2-ethylhexanoic acid was completely replaced by 362 grams (2.5 mols) of oxo $C_8$ acid. The oxo $C_8$ acid comprised various $C_8$ isomers the major components being 3,4-dimethyl-, 3,5-dimethyl and 4,5-dimethylhexanoic acid. The calcium salt solution clouded up after one week of storage in a closed bottle and became cloudy after three days storage in an open jar.

COMPARATIVE EXAMPLE C

Example A was repeated except that the 2 ethylhexanoic acid was completely replaced by 431 grams (2.5 mols) of Versatic 911 acid (a mixture of tri-alkyl acetic acids containing 9, 10 and 11 carbon atoms). These acids are all alpha di-substituted acids. When 1% of water was added to the product as in Example A, extensive crystallization appeared after about two months of storage in a closed container.

EXAMPLE 1

To 100 grams of a crystallized product from Example A, after two months storage in a closed container, was added 5 grams of a solution of calcium naphthenate in mineral spirits containing 4 percent calcium by wt. The molar ratio of 2-ethylhexanoate-to-naphthenate was therefore 25-to-1. The mixture of calcium salt solutions was heated with agitation to 250° F. and maintained at that temperature for 20 minutes until all of the crystals had dissolved. The clear product was then cooled to room temperature.

A first portion of the above solution was stored in an open one ounce jar and a second portion in a closed four-ounce bottle. The solution in the open jar remained clear and showed no signs of crystallization even after one month of storage. The product in the closed bottle was likewise clear and showed no signs of crystallization after over six months storage. This is to be compared with the results of comparative Example A and shows the surprisingly strong effect of even a small portion of calcium naphthenate when mixed with the unstable calcium 2-ethylhexanoate solution.

EXAMPLE 2

To another 100 grams of the crystallized product from comparative Example A was added 1.8 grams of naphthenic acid (acid No. 224) equivalent to 0.144 grams of calcium metal. The mixture was heated to 250° F. during which time displacement reaction occurred and a portion of the naphthenic acid reacted to replace an equivalent portion of the 2-ethylhexanoic acid in combination with calcium. The ratio of the naphthenate to the 2-ethylhexanoate was about 1-to-34, i.e. the solution contained about 2.8 mol. percent combined naphthenate salt. The results of the open and closed bottle storage tests were the same as in Example 1.

EXAMPLE 3

Comparative Example A was repeated except that a mixture of 345 grams (2.38 mols) of 2-ethylhexanoic acid and 30 grams (0.12 mol) of naphthenic acid was used in place of the 2-ethylhexanoic acid. Proportions of the final product stored in an open jar and in a closed bottle respectively were clear and showed no evidence of crystallization after over one month and six months of storage, respectively.

EXAMPLE 4

Comparative Example B was repeated except that 0.24 mol of the oxo $C_8$ acid was replaced by 60 grams (0.24 mol) naphthenic acid so that a mixture of acids was added. The storage test of the final product in an open jar and a closed bottle achieved the same results as Examples 1 to 3.

EXAMPLE 5

Example 4 is repeated except that 0.24 mol Versatic 911 acid is used in place of the naphthenic acid. The same results as in Example 4 are obtained after storage testing.

EXAMPLE 6

Comparative Example A was repeated except that 0.25 mol of the 2-ethylhexanoic acid was replaced by 40 grams (0.25 mol) of 3,5,5-trimethylhexanoic acid so that a mixture of acids were added. The final dissolved product remained clear after storage in an open jar and a closed bottle for one month and six months, respectively.

Another portion of the dissolved product was treated with a 50% solution of water in 2-ethoxyethanol as in Example A and the treated product remained a clear solution even after six months of storage in a closed container.

EXAMPLE 7

Comparative Example A was repeated except that 0.35 mol of 2-ethylhexanoic acid was replaced by 60 grams (0.35 mol) of Versatic 911 acids. The product was tested as in the preceding examples and no precipitate appeared and the product remained clear even after six months of storage in a closed container. The calcium salt of Versatic 911 acids salts as shown by comparative Example C is not stable in the pure state, but it does stabilize the unstable calcium 2-ethylhexanoate.

EXAMPLE 8

Comparative Example C was repeated except that the 0.24 mol of the Versatic 911 acid was replaced by 60 grams (0.24 mol) of naphthenic acid. A mixture of water in 2-ethoxyethanol was added to a portion of the salt solution to form a solution containing 1% water and this portion of the product was stored in a closed container for over six months. The solution remained clear and no crystallization appeared.

EXAMPLE 9

Example 8 is repeated except that 0.24 mol naphthenic acid is replaced by 0.24 mol of oxo $C_8$ acid. The same results were obtained after storage testing.

EXAMPLE 10

Example 3 was repeated except that the 2-ethylhexanoic acid was replaced by 2-ethylhexenoic acid. Portions of the product stored in closed bottle remained clear and showed no evidence of crystallization after over 12 months of storage.

Calcium salts in the present invention can be used alone in drier compositions or they can be used in combination with other metal salts prepared from the same or other organic acids, such as naphthenic acids and tall oil fatty acids. In addition to the metal salts in the solvent, the drier compositions can contain additives such as viscosity agents, dispersing agents, anti-skinning agents, and viscosity controlling agents in the amounts ordinarily employed for the purposes indicated. Similarly, when used as vinyl resin stabilizers, these salts can be combined with the other additives normally used for such purposes, such as other salts.

What is claimed is:

1. A stable solution containing dissolved calcium comprising an organic solvent and as the solute a major molar proportion of a first salt of calcium and at least one acid selected from the group consisting of branched chain, olefinically unsaturated and saturated aliphatic monocarboxylic acids having from about six to about eighteen carbon atoms, all of the acid forming the first salt being branched at the same chain position relative to the carboxylic group and a minor molar proportion of a second salt of calcium and at least one acid selected from the group consisting of saturated and olefinically unsaturated cycloaliphatic monocarboxylic acids and saturated and olefinically unsaturated branched-chain aliphatic monocarboxylic acids; if the second acid is aliphatic, the branching must be at a different effective position than the branching of the first acid, the three effective positions being a branch in the alpha position, two branches in the alpha position, and a branch at the beta or further removed position relative to the carboxylic group.

2. The stable solution of claim 1 wherein the acid for the first salt is saturated.

3. The stable solution of claim 1 wherein the acid for the second salt is a saturated cycloaliphatic monocarboxylic acid and is present in amounts of up to about 30 mol percent of total acid groups present in the combined calcium salts.

4. The stable solution of claim 1 wherein the acid for the second salt is an unsaturated cycloaliphatic monocarboxylic acid and is present in amounts of up to about 30 mole percent of total acid groups present in a combined calcium salt.

5. The stable solution of claim 1 wherein substantially all of the acid present in both the first and second salts is saturated aliphatic monocarboxylic acid.

6. The stable solution of claim 1 wherein substantially all of the acid present in both the first and second salts is unsaturated aliphatic monocarboxylic acid.

7. The stable solution of claim 5 wherein the second salt is the salt of a saturated branched-chain aliphatic monocarboxylic acid.

8. The stable solution of claim 5 wherein the acid group in the first salt is branched in the alpha-position.

9. The stable solution of claim 5 wherein the acid group in the first salt is 2-ethylhexanoate.

10. The stable solution of claim 1 wherein the acid group of the second salt containing calcium contains from about 6 to about 18 carbon atoms.

11. The stable solution of claim 5 wherein the acid group in the second salt is branched in the beta or a further removed position.

12. The stable solution of claim 11 wherein the first salt is branched in the alpha position.

13. The stable solution of claim 5 wherein the acid group in the first salt is alpha-branched and in the second salt has two branches in the alpha position.

14. The stable solution of claim 5 wherein the acid group in the first salt is branched in the beta or further removed position and the second salt is branched in the alpha position.

15. The stable solution of claim 5 wherein substantially none of the acid combined with the calcium has its closest branch in a position further removed than the epsilon position.

16. The stable solution of claim 1 wherein the second salt is present in a proportion of at least about one mole percent.

17. The stable solution of claim 1 wherein the organic solvent is an inert organic material selected from the group consisting of hydrocarbon solvents, chlorinated hydrocarbon solvents, hydroxy-containing such solvents and oxy-ether substituted such solvents.

References Cited
UNITED STATES PATENTS

| | | | |
|---|---|---|---|
| 2,042,035 | 5/1936 | Brennan | 252—39 |
| 2,081,075 | 5/1937 | Volbach | 252—39 |
| 2,218,618 | 10/1940 | McNab | 252—39 |
| 2,137,494 | 11/1938 | Jolly | 252—39 |
| 2,223,129 | 11/1940 | Prutton | 252—39 |
| 2,223,167 | 2/1941 | Lazer | 252—39 |
| 2,239,953 | 4/1941 | Fairlie | 252—39 |
| 2,272,923 | 2/1942 | Prutton | 252—39 |
| 2,320,228 | 5/1943 | Frey | 252—39 |
| 2,320,392 | 6/1943 | White | 252—39 |

GEORGE F. LESMES, Primary Examiner

J. P. BRAMMER, Assistant Examiner

U.S. Cl. X.R.

252—39; 260—414